United States Patent [19]

Oshima

[11] Patent Number: 4,742,387
[45] Date of Patent: May 3, 1988

[54] METHOD AND APPARATUS FOR AUTOMATICALLY ESTABLISHING A COLOR BALANCE OF A COLOR TELEVISION MONITOR INCLUDING AN AMBIENT LIGHT SENSING AND DATA COMPENSATING FUNCTION

[75] Inventor: Junichi Oshima, Kanagawa, Japan

[73] Assignee: Sony Corporation, Tokyo, Japan

[21] Appl. No.: 23,110

[22] Filed: Mar. 6, 1987

[30] Foreign Application Priority Data

Mar. 17, 1986 [JP] Japan .................................. 61-58568
Mar. 20, 1986 [JP] Japan .................................. 61-63175

[51] Int. Cl.⁴ .............................................. H04N 9/73
[52] U.S. Cl. ...................................... 358/29; 358/10; 358/161
[58] Field of Search ........................... 358/10, 29, 161

[56] References Cited

U.S. PATENT DOCUMENTS 3,315,029  4/1967  Suhrmann ............................ 358/161
3,479,448  11/1969 Kollsman ............................. 358/29
3,573,352  4/1971  Fujita ................................... 358/29
3,962,722  6/1976  Ciciora ................................. 358/10
4,123,775 10/1978  Bugni .................................. 358/29

FOREIGN PATENT DOCUMENTS

63919  6/1978  Japan ................................... 358/29
103321  9/1978  Japan ................................... 358/29
105925  8/1979  Japan ................................... 358/29
 32877  4/1981  Japan ................................... 358/29
145481  9/1982  Japan ................................... 358/29
2169773 7/1986  Japan ................................... 358/29

Primary Examiner—John W. Shepperd
Attorney, Agent, or Firm—Lewis H. Eslinger

[57] ABSTRACT

An apparatus for automatically establishing a color balance for a color television monitor includes a sensor device which is separably attached to the screen of the monitor to detect the brightness of the ambient light. The ambient light brightness detected when no image is displayed is used to compensate reference data for establishing a color balance of the color signals independent of the ambient light.

16 Claims, 8 Drawing Sheets

METHOD AND APPARATUS FOR AUTOMATICALLY ESTABLISHING A COLOR BALANCE OF A COLOR TELEVISION MONITOR INCLUDING AN AMBIENT LIGHT SENSING AND DATA COMPENSATING FUNCTION

FIELD OF THE INVENTION

This invention relates to a color television monitor and in particular is directed to a method and apparatus for establishing a desired color balance for a color image produced by the color television monitor.

BACKGROUND OF THE INVENTION

High performance color television monitors are used at television stations and in studios in place of conventional television receivers in order to provide a superior television image with a high degree of accuracy in such factors as color saturation, hue and white balance. In order to attain this high accuracy, these factors are not preset by hardwired circuitry, but rather are adjustable and may be brought into exact accordance with standard or selected values for these factors.

In the prior art, it was common for these factors to be adjusted by a highly experienced operator who manually adjusted various controls while watching a display of color bars on the display screen of the cathode ray tube (CRT) of the monitor. When color saturation and hue are to be adjusted, the display screen displays standard color bars from a color bar generator representing the standard values of the individual factors together with color bars generated by the monitor and the operator makes adjustments to match the colors. Color balance adjustment similarly requires a matching of light intensities for the three primary color signals. However, this manual adjustment requires a highly skilled, experienced operator with an excellent eye for colors. When only less able operators are available, the matching process is imprecise and unsatisfactory.

Therefore, a color television monitor system in which these factors may be adjusted automatically has been proposed in U.S. patent application Ser. No. 06/849,528, filed April 8, 1986 and assigned in common with the present application. In this system, when the color saturation and hue are to be adjusted, the monitor is supplied with a color bar signal from a color bar generator. The color bar generator generates an output signal in which each horizontal line period is divided into successive periods during which signals corresponding to respective predetermined colors are generated, so that the television image is constant and appears as a series of vertical stripes or bars of those colors, respectively. The monitor demodulates three primary color signals from the selected color bar signal by extracting the red signal R during that portion of the horizontal period when the red bar is generated, the blue signal B during that portion when the blue bar is generated, and the green signal G during that portion when the green bar is generated. In the present specification, the portion of the horizontal period during which each color bar is generated will be referred to as the period of the respective color bar.

The color saturation and hue can be adjusted by sampling the signals produced when different ones of the color bars are being generated. Specifically, if the color saturation is correctly adjusted, the level of the blue signal B obtained when the white bar is generated will be equal to the level of the blue signal B obtained when the blue bar is generated. Correspondingly, if the hue is correctly adjusted, the levels of the blue signal B obtained during the periods of the white bar, magenta bar and cyan bar should all be the same.

Therefore, in order to adjust the color saturation to the correct level, the color gain of the color television signal is adjusted so as to equalize the levels of the blue signal B during the white bar period and the blue bar period. Correspondingly, in order to correctly adjust the hue, the phase of the color subcarrier signal is controlled so as to equalize the levels of the blue signal B during the white bar period, the magenta bar period and the cyan bar period.

In addition to these adjustments, the system proposed in the above-identified application permits an automatic adjustment of the white balance. The color temperature defines the shade of white generated by a color picture tube. A black object turns different colors as it is heated and at a temperature of 6800° K. it turns to a shade of white that corresponds to a standard white raster in the NTSC system. Proper adjustment of the color temperature for neutral white balance results in pictures of sharp contrast. In the color television or monitor, the sensation of white light is produced by combining equal energy, red, green and blue light. Color temperature adjustment sets the beam currents so that a white light output is obtained. If all the color phosphors on the screen of the CRT were of equal efficiency, equal beam currents would produce a neutral white raster, but in practice the color phosphors differ in efficiency. Therefore, white balalnce is adjusted by looking at or sensing the colors or intensities of the red, green and blue signals and adjusting them to produce a good white raster.

To achieve the automatic adjustment in the proposed system, a uniform, low brightness red image is displayed on the entire screen of the CRT and the brightness thereof is measured by a sensor. The low brightness red signal has a signal level of between ten and twenty IRE. The measured value of the brightness is compared to a reference color temperature value and the gain and bias of the driving circuit of the CRT are controlled to change the level of the red signal until the measured value equals the reference value.

Next, a high brightness red image is displayed on the screen of the CRT and the brightness thereof is measured by the sensor. The high brightness red signal has a signal level of 100 IRE. Again the gain and bias of the driving circuit are adjusted to make the measured value equal to a high brightness red reference value. Thereafter, low brightness and high brightness green images and low brightness and high brightness blue images are displayed on the screen and measured, and again the gain and bias of the driving circuit are adjusted to make the measured values equal to the reference value.

However, when the white balance is adjusted in this manner, ambient light from lamps, lighting fixtures, etc. will add to the light emitted from the screen of the CRT and will be included in the total brightness measured by the sensor. Consequently, the measured data indicates a brightness greater than the actual brightness produced by the CRT alone, and under such circumstances there will be an error in the white balance adjustment. In particular, when the low brightness images are measured and adjusted, the ambient light is comparatively large as compared to the brightness from the screen, and so the data produced by the sensor reflects the ambient light to a comparatively large degree. When the high brightness colors are measured and adjusted, the ambient light is relatively small. Thus, there will not only be an absolute difference between the light data measured and the light produced by the screen, but the proportional error produced by the ambient light will differ from the low brightness images to the high brightness images.

In an effort to avoid these difficulties, the sensor is arranged within a suction cup which may be removably attached to the screen of the CRT to cut off the ambient light as much as possible. However, this arrangement is not completely satisfactory because some ambient light may still reach the sensor by passing through the glass screen and being reflected into the sensor. Given the extremely high degree of accuracy required for this type of monitor, even this degree of error is undesirable.

There is a second difficulty associated with the sensor. Typically, the sensor is formed of a photovoltaic photodiode and the output current thereof is typically very small, for example 0.55 A at 100 lux. Consequently, it is necessary to greatly amplify the output current from the sensor, with a high gain amplifier, and it is well known that in such high gain amplifiers the offset and drift can be significant. While a chopper amplifier may be used to eliminate the offset and drift, such amplifiers are generally complicated and/or expensive. Consequently, the response of the high gain amplifier to the output current from the sensor will vary over time, presenting a highly disadvantageous feature in such an exacting adjustment as the while balance adjustment in a high performance color television monitor.

OBJECTS AND SUMMARY OF THE INVENTION

Accordingly, it is an object of the present invention to provide apparatus for automatically establishing a color balance of a color television monitor which avoids the above-described difficulties of the prior art manual adjustment method and the earlier proposed automatic adjustment apparatus.

It is another object of the present invention to provide apparatus for automatically establishing a color balance of a color television monitor which measures the ambient light which enters the sensor when the displayed images are sensed to provide compensated reference data for adjusting the white balance of the monitor.

It is a further object of the present invention to provide apparatus for automatically establishing a color balance of a color television monitor in which new reference data can be measured at the monitor and corrected for the presence of ambient light.

In accordance with an aspect of the present invention, apparatus for automatically establishing a color balance of a color television monitor including a color cathode ray tube having a display surface at which the television image is presented comprises adjustable drive means for driving the color cathode ray tube to produce a color image, sensor means adapted for separable attachment to the display surface for sensing thereat an ambient light brightness when the drive means does not drive the color cathode ray tube and providing ambient light data corresponding to the sensed ambient light brightness, a source of reference data indicative of a reference color balance of the color image, compensating means for compensating the reference data with the ambient light data and adjusting means for controlling the adjustable drive means in response to the compensated reference data to establish the color balance of the color image independent of the ambient light brightness.

The above and other objects, features and advantages of the present invention will become apparent from the following detailed description of the preferred embodiment taken in conjunction with the accompanying drawings, throughout which like reference numerals designate like elements and parts.

DESCRIPTION OF THE PREFERRED EMBODIMENT

Figure 1:
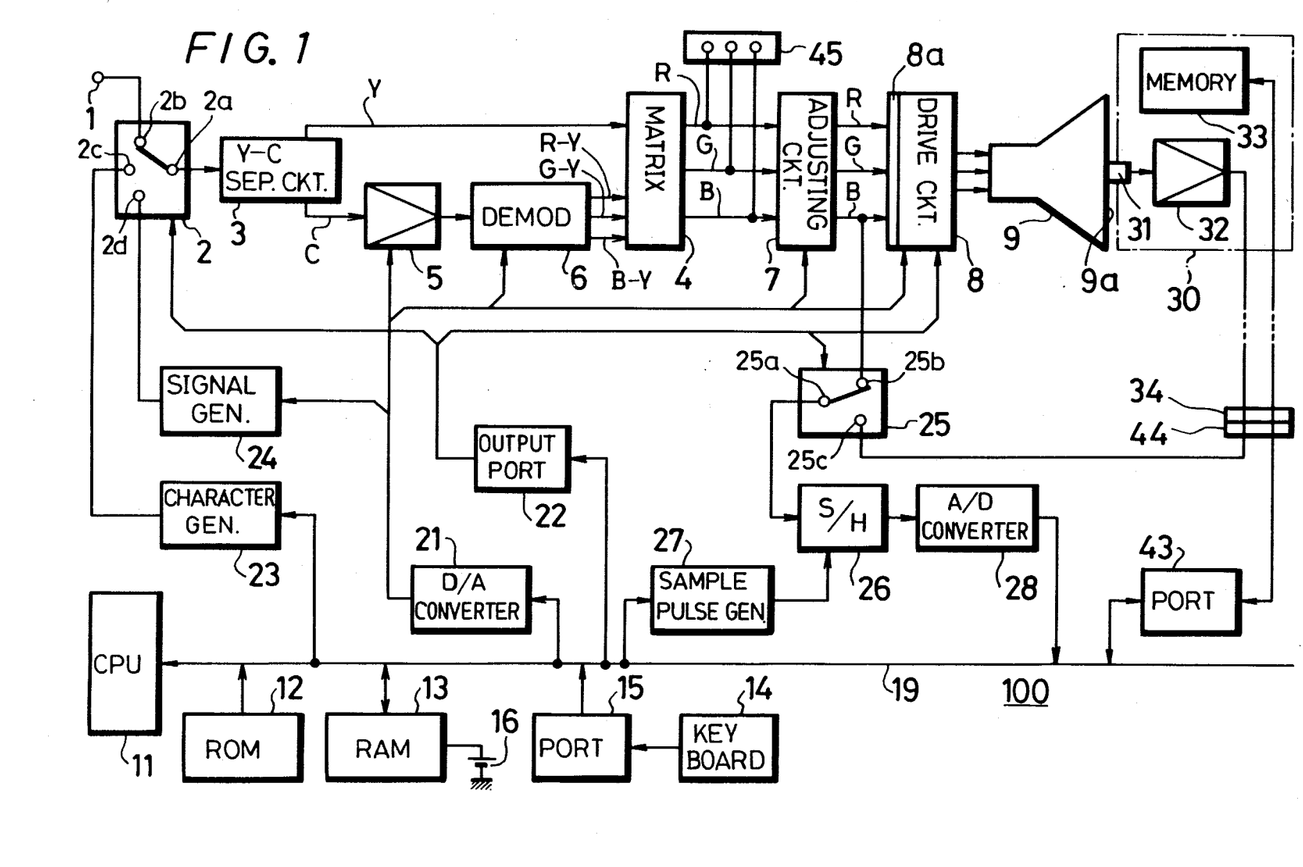
FIG. 1 is a schematic block diagram illustrating a circuit arrangement of an embodiment of the apparatus for automatically establishing a color balance of a color television monitor in accordance with the present invention.

Referring now to the drawings and initially to FIG. 1 thereof, the preferred embodiment of the monitor 100 according to the present invention has a composite color video signal supplied thereto through an input terminal 1. The composite color video signal is supplied to a fixed contact 2b of a switching circuit 2 and thence from a moveable contact 2a thereof to a luminance/-chrominance (Y/C) separating circuit 3 which separates a luminance signal Y and a chrominance signal C from the input composite color video signal. Luminance signal Y is supplied directly to a matrix circuit 4, while chrominance signal C is supplied through a gain controlled amplifier 5 to a color demodulator 6 in which it is demodulated to produce red, green and blue color difference signals R-Y, G-Y and B-Y. The color difference signals are supplied to matrix circuit 4, which combines them with luminance signal Y to produce red, green and blue primary color signals R, G, B. Primary color signals R, G and B are supplied to an adjusting circuit 7 which controls the brightness and contrast of these signals, as will be discussed below, and thence to an adjustable drive circuit 8. Drive circuit 8 includes an internal bias circuit 8a for individually changing the bias of the red, green and blue signals R, G, B in stepwise fashion. Drive circuit 8 supplies control signals in response to the primary color signals R, G, B to a color cathode ray tube (CRT) 9 to present a color image corresponding to the composite color video signal at a display screen 9a thereof.

Figure 2A:
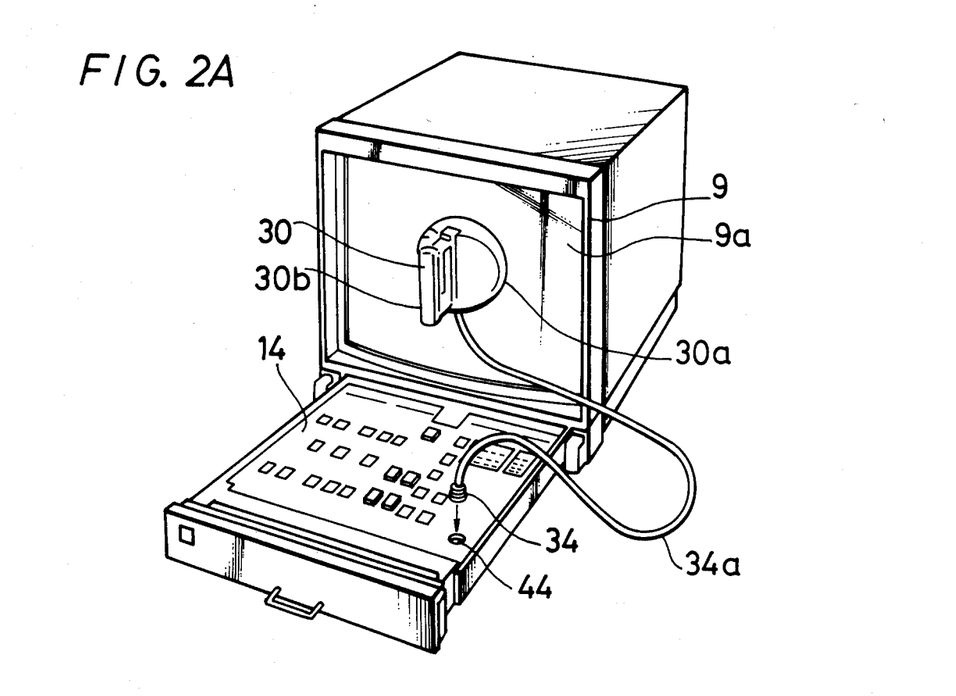
FIG. 2A is a perspective view of a working model of the embodiment of FIG. 1 in use.

In accordance with an important aspect of the present invention, the above-described elements and in particular drive circuit 8 are controlled to establish the desired white balance under the general control of a central processing unit (CPU) 11 capable of 8-bit parallel processing. CPU 11 utilizes a read only memory (ROM) 12 in which are stored programs and data for the automatic adjustment of television monitor 100 and in particular includes a routine for automatically adjusting the white balance, as discussed later in connection with FIGS. 4A and 4B. CPU 11 also utilizes a random access memory (RAM) 13 as a work and data storage area and a keyboard 14 adapted to allow the operator to input mode control commands and other information used during the automatic adjustment process through a port 15. RAM 13 may advantageously be constructed using CMOS technology and is backed up by a battery 16 to maintain the data stored therein during power turn-off, as will be discussed below. Keyboard 14 is advantageously a drawer type keyboard adapted to be withdrawn from a slot below display screen 9a of monitor 100 (FIG. 2A). ROM 12, RAM 13 and port 15 are all connected to CPU 11 through a system bus 19.

Also connected to system bus 19 is a digital-to-analog (D/A) converter 21 which converts digital signals from CPU 11 into corresponding analog signals supplied to amplifier 5, demodulator 6, adjusting circuit 7 and drive circuit 8 as control signals. Switching circuit 2 and drive circuit 8 are further controlled in response to control signals from CPU 11 passed through an output port 22 in digital form. A character generator 23 is also controlled by CPU 11 and at appropriate times generates character video signals which, when ultimately transferred to CRT 9 as discussed below, produce instructions for assisting the operator using the color television monitor. These character video signals are supplied through switching circuit 2 when switching circuit 2 is controlled by CPU 11 to have its moveable contact 2a switched to a fixed contact 2c for transmission through Y/C separation circuit 3 and thence through amplifier 5, demodulator 6, matrix 4, adjusting circuit 7 and drive circuit 8, which will hereafter be collectively referred to as the rear stage circuits when their individual functions are conventional. Upon prompting of these displayed instructions, the operator interactively adjusts the color television monitor.

A signal generator 24 is used for generating low brightness and high brightness video signals used when the white balance is being adjusted at times determined by control signals generated within CPU 11 and transmitted to signal generating circuit 24 through D/A converter 21. The video signal from signal generator 24 is supplied to a fixed contact 2d of switching circuit 2, and moveable contact 2a is switched to receive the video signal from fixed contact 2d in response to corresponding control signals from CPU 11 supplied through output port 22.

A second switching circuit 25 has a moveable contact 25a and two fixed contacts 25b and 25c, the first of which receives a selected one of adjusted red, green and blue primary color signals R, G, B output from adjusting circuit 7. In the preferred embodiment illustrated in FIG. 1, the blue signal B is received. Moveable contact 25a of switching circuit 25 is moved between fixed contact 25b and 25c in response to control signals supplied from CPU 11 through output port 22. The received signal is supplied through moveable contact 25a to a sample and hold circuit 26, which samples and holds the output signal from switching circuit 25 in response to sampling pulses generated by a sampling pulse generator 27 in synchronism with the horizontal and vertical synchronizing signals within a received color bar signal, as discussed below. Sampling pulse generator 27 is connected through system bus 19 to CPU 11 to receive control signals therefrom. The output of sample and hold circuit 26 is supplied to an analog-to-digital (A/D) converter 28, and the digital signal produced therefrom is then supplied through system bus 19 back to CPU 11 for processing.

Figure 2B:
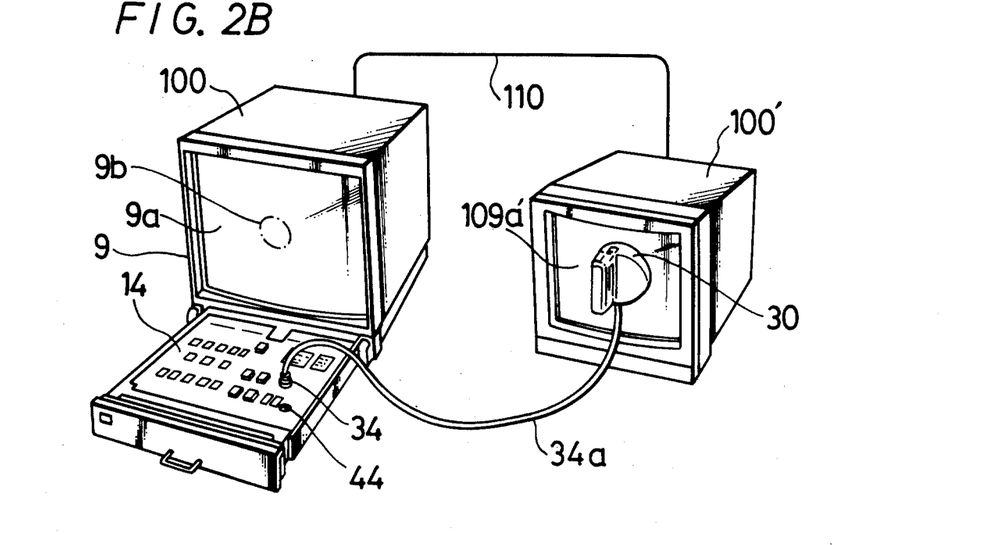
FIG. 2B is a perspective view of the working model of FIG. 2A used in connection with an additional monitor.

The second fixed contact 25c of switching circuit 25 is connected to receive the signal from a probe 30 which forms an important component of the apparatus according to the present invention. As illustrated in FIGS. 2A and 2B, probe 30 has an external body 30a in the form of a suction cup and is adapted to be attached by suction to display screen 9a of CRT 9. Probe 30 also includes a handle 30b for easy removal of suction cup portion 30a from display screen 9a when desired. Contained within suction cup portion 30a and adapted to be screened as much as possible from ambient light thereby during use is a photosensor device 31 (FIG. 1) which receives the light from the display surface 9a of CRT 9, a waveform shaping amplifier 32 for amplifying the output from photosensor device 31 and a non-volatile memory 33. The amplified signal from amplifier 32 is supplied to fixed contact 25c of switching circuit 25 through a plug 34 and jack 44. As illustrated in FIG. 2A, plug 34 at the end of a connecting cable 34a connected to probe 30 is plugged into jack 44 on keyboard 14. The signal received at jack 44 is transmitted (FIG. 1) through switching circuit 25 when moveable contact 25a is switched to fixed contact 25c and the signal is then transmitted through sample and hold circuit 26, A/D converter 28 and system bus 19 to CPU 11.

Advantageously, memory 33 is an electrically eraseable programmable read only memory, that is, an EEPROM (registered trademark) memory, and it stores reference data used for adjusting the white balance. In the preferred embodiment, memory 33 stores four sets of color temperature data for achieving four different white balances, for example a standard white balance, a bluish white balance, and the like, so that the white balance may be selected for a particular purpose if desired. One of the sets of color temperature data is advantageously predetermined and stored in memory 33 during the manufacturing process before shipment from the factory. The data stored in memory 33 is accessed serially and may be transferred to system bus 19 through a bidirectional port 43.

The operation of monitor 100 in automatically performing the color saturation and hue adjustments will now be described. In these adjustments, probe 30 is not used.

Figure 3A:
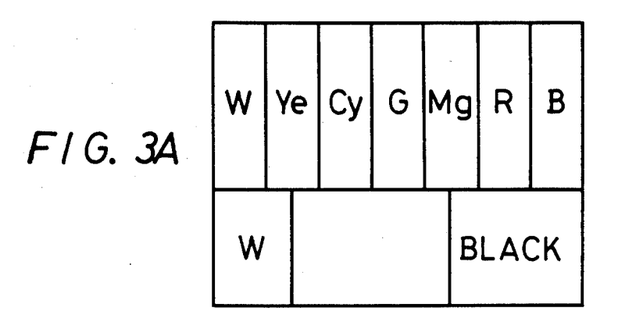
FIG. 3A is a diagram illustrating the display of an EIA color bar signal.
Figure 3B:
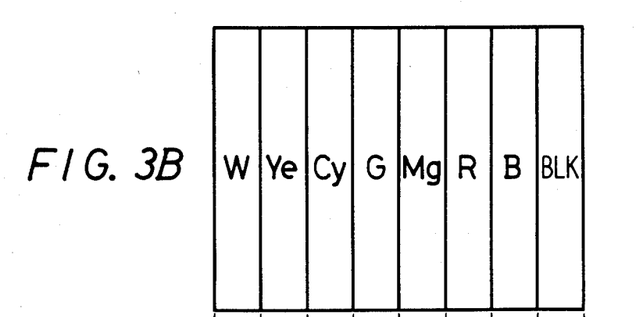
FIG. 3B is a diagram illustrating the display of a full field color bar signal.

To begin these adjustments, a standard color bar signal is supplied from a color bar generator (not illustrated) to input terminal 1. A number of different types of color bar signals are available worldwide, including the EIA (Electronic Industries Association) color bar signal and the full field color bar signal. The operator inputs a command from keyboard 14 to indicate that the color saturation and hue adjustments are to be performed, and the command is transmitted through port 15 to CPU 11. In response thereto, CPU 11 outputs a control signal through output port 22 to switching circuit 2 to move moveable contact 2a to fixed contact 2c. In addition, CPU 11 outputs a control signal to character generator 23 to cause it to output a character video signal which, when supplied through switching circuit 2 through the rear stage circuits, ultimately causes the display on screen 9a of an inquiry asking the operator what type of color bar signal is being input at input terminal 1. In particular, in the preferred embodiment the inquiry is whether the input color bar signal is the EIA color bar signal, as illustrated in FIG. 3A, or the full field color bar signal, as illustrated in FIG. 3B. For the purpose of this example, let it be assumed that the input color bar signal is the full field type of FIG. 3B, and so the operator enters a second command so identifying the input color bar signal by pressing appropriate keys on keyboard 14, and the second command is then transmitted to CPU 11.

Figure 3C:
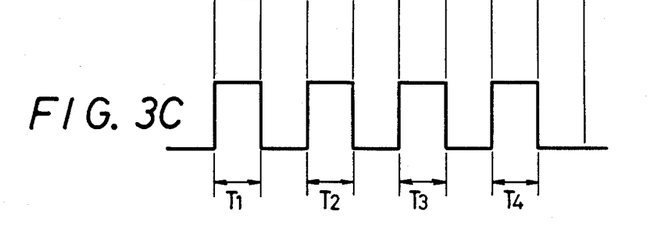
FIG. 3C is a schematic diagram of the levels of a blue signal B sampled at times defined by the color bars of FIG. 3B.

CPU 11 then outputs a control signal through output port 22 to switching circuit 2 to switch moveable contact 2a to fixed contact 2b to receive the color bar signal input at input terminal 1 so that the color bar signal is delivered to the rear stage circuits. In addition, CPU 11 transmits a signal through output port 22 to switching circuit 25 to switch moveable contact 25a to fixed contact 25b to receive the blue signal B output from adjusting circuit 7. At this time, since the input to the rear stage circuits is the input color bar signal, the blue signal B from adjusting circuit 7 corresponds to the blue signal in the color bar signal. CPU 11 causes sampling pulse generator 27 to control sample and hold circuit 26 so as to sample the received signal at time periods $T_1-T_4$, as illustrated in FIG. 3C. The sampled time periods correspond to the periods of the white, cyan, magenta and blue bars, respectively.

If the color saturation is already correctly adjusted, the levels of the blue signal B will be the same during the time periods $T_1$ and $T_4$, that is, during the white bar and blue bar periods. If the hue is already correctly adjusted, the level the blue signal B will be the same during time periods $T_1$, $T_2$ and $T_3$, that is, during the periods of the white bar, cyan bar and magenta bar. The procedure to determine if the color saturation and hue are correctly adjusted and to adjust them if necessary is performed as follows.

The color saturation is adjusted first. The blue signal B during the white bar period $T_l$ of a predetermined horizontal line is sampled and held by sample and hold circuit 26 in response to a pulse from sampling pulse generator 27. The sampled output is converted in A/D converter 28 into a digital data signal indicative of the level of blue signal B during the white bar time period $T_l$ and is stored in RAM 13. The blue signal B during a subsequent blue bar period $T_4$ is similarly sampled and held, converted to a digital signal and also stored in RAM 13. CPU 11 then compares the data indicative of the two sampled levels of the blue signal to determine if they are equal. If they are equal, the color saturation is already correctly adjusted and CPU 11 proceeds to the hue adjustment. However, if the two stored levels are different form each other, CPU 11 transmits a control signal through D/A converter 21 to amplifier 5 to adjust the gain of amplifier 5 in a direction to reduce the difference between the sampled levels. Advantageously, the gain of amplifier 5 may be changed in a step by step fashion and the gain is changed by one step in response to the comparison. Thereafter, either the original level of the blue signal B during the white bar period $T_l$ is kept as a reference level and the blue signal B during the blue bar period $T_4$ is repetitively sampled, or the blue signal B in both white and blue bar periods $T_1$, $T_4$ is repetitively sampled. In either case, the level of the blue signal B during the blue bar period $T_4$ and the level of the blue signal B during the white bar period $T_l$ are repetitively compared to determine if the step change in the gain of amplifier 5 has resulted in equalizing the levels. As long as the levels of the sampled signals are different from each other, the gain of amplifier 5 is further changed by additional steps in the direction for equalizing the levels. This process continues until the two levels are equalized. At that point, CPU 11 determines that the color saturation is correctly adjusted, terminates the color saturation adjustment and initiates the hue adjustment.

For the hue adjustment, the levels of the blue signal B during white bar, cyan bar and magenta bar periods $T_1$, $T_2$ and $T_3$ are detected and stored in RAM 13 in response to sampling pulses produced by sampling pulse generator 27 at the appropriate times. The level sampled during white bar period $T_1$ is used as a reference level, and the levels sampled during cyan bar and magenta bar periods $T_2$ and $T_3$ are respectively compared to this reference level. If there is any difference detected between the levels sampled during periods $T_2$ and $T_3$ and the reference level, CPU 11 detects this and supplies a control signal through D/A converter 21 to color demodulator 6 so as to change the phase of the color subcarrier signal used in the color demodulation process therein. As with the gain control of amplifier 5, the phase control within color demodulator 6 is advantageously performed in a stepwise manner. When the levels of the blue signal B during periods $T_2$ and $T_3$ are not equal to the level of the blue signal during time period $T_1$, the phase is changed by one step in the direction so as to equalize the levels. Thereafter, as with the color saturation adjustment, the levels are repetitively sampled and compared and the phase of the color subcarrier signal is successively changed step by step until the three levels become equal to each other. At this point, CPU 11 determines that the hue has been correctly adjusted and terminates the hue adjustment procedure.

Next, the brightness and contrast are adjusted to correspond to desired reference values established by reference data stored in ROM 12. The brightness is adjusted by sampling the level of the blue signal B during white bar period $T_1$ and comparing the level with the reference data in ROM 12, in response to which CPU 11 transmits a control signal to adjusting circuit 7 through D/A converter 21 to adjust a direct-current gain therein. The contrast is adjusted by sampling the level of the blue signal B during the period of the black bar (BLK) in the color bar signal, comparing the level with the reference data and controlling an alternating current gain in adjusting circuit 7 in response to the comparison.

After the adjustments for color saturation, hue, brightness and contrast have all been completed, CPU 11 transmits a control signal to switching circuit 2 to switch moveable contact 2a to fixed contact 2c, and further transmits a control signal to character generator 23 to output another character video signal, causing the display of a sentence on display screen 9a to the effect that these adjustments have been completed and the adjustment procedure is terminated. After this sentence has been displayed for a predetermined time, CPU 11 switches moveable contact 2a to contact fixed contact 2b to place monitor 100 in its normal operating condition. At this point, a composite color video signal may be input at input terminal 1 to resume monitor operation. However, the final data indicative of the levels of the blue signal B during time periods $T_1$ and $T_4$ and the black bar period of the color bar signal remain stored in RAM 13 to provide the data sampled when the color saturation, hue, and brightness and contrast were all correctly adjusted. This data is then available for later use, as will be described below.

Figure 4A:
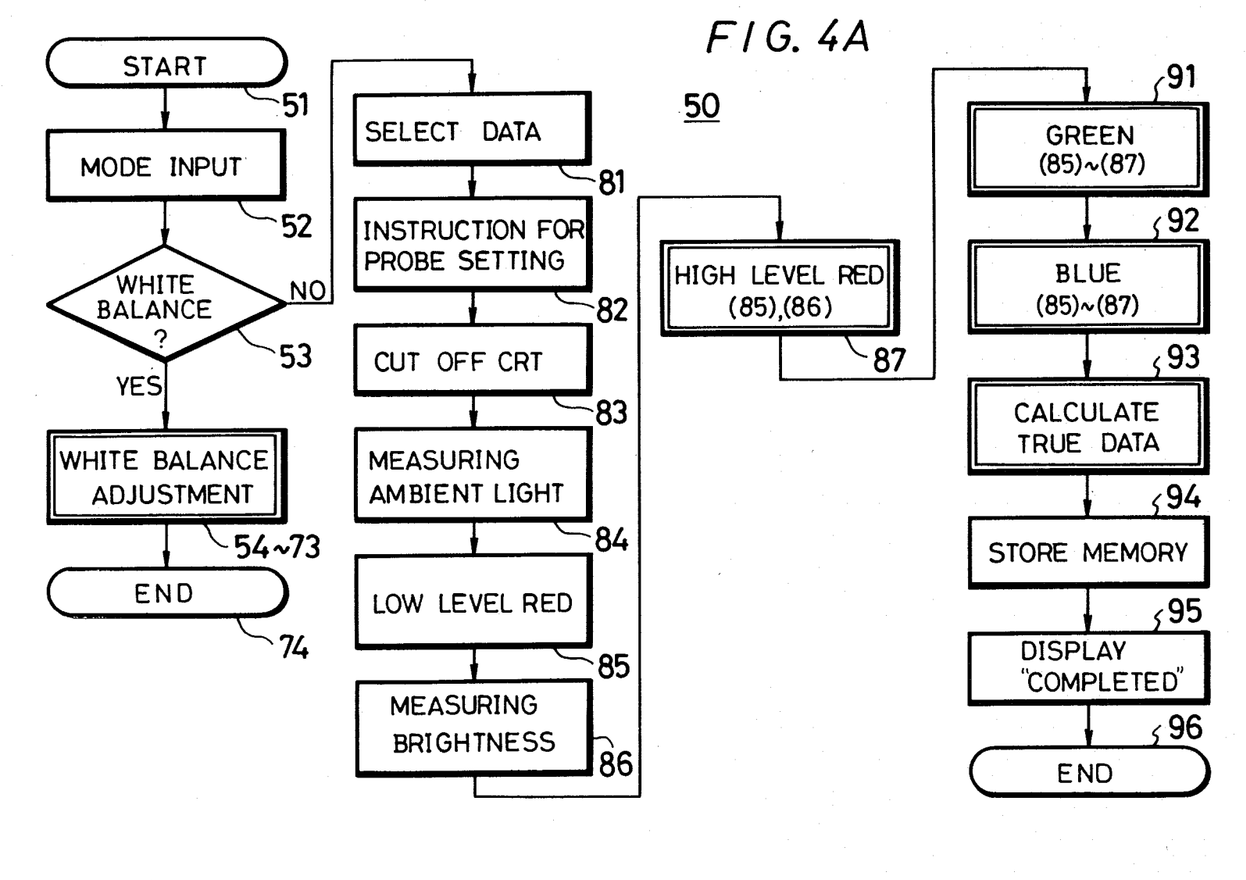
FIGS. 4A and 4B are sections of a flow chart illustrating a routine for white balance adjustment performed by the apparatus according to the present invention.
Figure 4B:
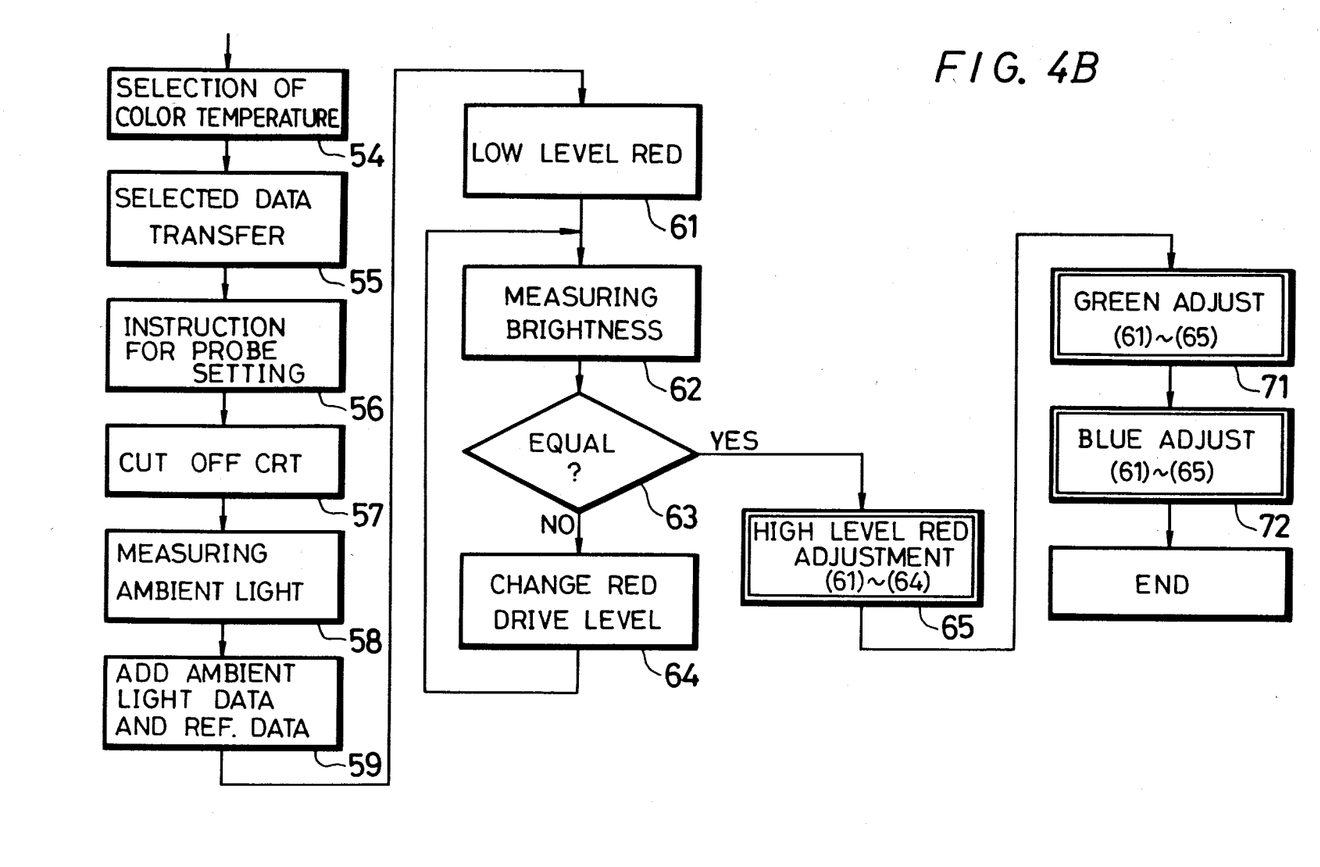

The white balance adjustment may now advantageously be performed, and this requires the use of probe 30. To begin the operation, plug 34 is connected with jack 44 and the operator enters a command through keyboard 14 indicating the start of the white balance adjustment. In response to the command, CPU 11 loads a white balance adjustment routine 50 stored in ROM 12 and begins its execution. Routine 50 is illustrated in FIGS. 4A and 4B. As shown therein, at step 52 (FIG. 4A), CPU 11 moves moveable contact 2a to fixed contact 2b and character generator 23 is caused to output a character video signal supplied through the rear stage circuits to cause the display on display screen 9a of an inquiry asking the operator whether the white balance is to be adjusted in response to previously stored color temperature information or whether new color temperature information is to be measured and newly stored. The operator inputs a command indicating which procedure is to be followed, and the key input is recognized in step 53. Assuming first that previously stored color temperature data is to be used, routine 50 proceeds to step 54 to begin the white balance adjustment. Steps 54 through 73 are illustrated in FIG. 4B.

At step 54, CPU 11 causes character generator 23 to output a character video signal resulting in the display of an inquiry asking the operator which of the four sets of color temperature data stored in memory 33 of probe 30 is to be selected to define the reference values. The operator may choose either the first set of color temperature data previously stored in memory 33 at the factory, or may choose a different set of color temperature values if any additional sets have been previously measured and stored in memory 33 by the process illustrated in steps 88–96 of routine 50, to be discussed below.

The operator identifies the first set of color temperature data by a command input through keyboard 14 and in step 55 CPU transmits a signal through port 43 to memory 33, in response to which memory 33 transmits the first set of color temperature data serially out therefrom back through port 43 to be stored in RAM 13. At step 56, CPU 11 causes character generator 23 to transmit a character video signal to cause the display on screen 9a of an image defining a window portion or sensing area 9b at a particular location on screen 9a (FIG. 2B). Advantageously, window portion 9b is created at the center of display screen 9a and may be defined by a closed loop corresponding in size and shape to suction cup portion 30a of probe 30. The character video signal from character generator 23 also causes the display of an instruction to the operator to attach probe 30 to display screen 9a at window portion 9b. Defining window area 9b at the predetermined position on display screen 9a for the positioning of photosensor device 31 enables CPU 11 to cause sample and hold circuit 26 to sample the output signal therefrom at a predetermined time exactly corresponding to this predetermined position, as will be discussed below. After probe 30 has been attached to display screen 9a at window portion 9b, the operator inputs a command from keyboard 14 that the process has been completed.

At step 57 CPU 11 sends a control signal through output port 22 to adjustable drive circuit 8 to cutoff all three primary color signals R, G and B so that no light is emitted by CTR 9. At step 58, CPU 11 causes switching circuit 25 to switch moveable contact 25a to fixed contact 25c to receive the output signal from photosensor device 31 through amplifier 32, plug 34 and jack 44. Sample and hold circuit 26 samples the output signal at the predetermined time corresponding to the predetermined position of photosensor device 31 on display screen 9a, and the sampled signal is converted into digital form by A/D converter 28 and stored in RAM 13. Since at this time drive circuit 8 does not drive CRT 9, the data provided to CPU 11 indicates a level only of the ambient light which enters photosensor device 31 from outside of monitor 100. Consequently, the data at this time is ambient light data corresponding to the sensed ambient light brightness.

At step 59 CPU 11 adds the ambient light data to the reference color temperature data transferred from memory 33 to RAM 13 at step 55. Thus, the reference data stored in RAM 33 is compensated by the ambient light data to be data indicative of a total brightness brighter by the brightness of the ambient light entering photosensor device 31 and thus constitutes compensated standard data.

Thereafter, at step 61, CPU 11 causes moveable contact 2a to contact fixed contact 2d to receive the signal from signal generator 24, which is controlled by CPU 11 to produce a low brightness video signal. In addition, CPU 11 sends a control signal to drive circuit 8 to cause it to cutoff the green signal G and blue signal B, with the result that display screen 9a displays an image of uniform low brightness red light. At step 62, the low brightness red light received by photosensor device 31 causes it to produce a signal through amplifier 32 indicative of the total brightness received, which includes the low brightness red light and the ambient light at the time of measurement. CPU 11 then causes moveable contact 25a to contact fixed contact 25c. The output signal from photosensor device 31 is supplied through switching circuit 25 to sample and hold circuit 26, which samples the signal indicative of the total brightness at the predetermined timing corresponding to the position of photosensor 31.

The sampled signal is converted to digital form by A/D converter 28 and stored in RAM 13. At step 63, this data indicative of the total brightness including the low brightness red light obtained at step 62 is compared with the corresponding compensated reference data as compensated by the ambient light in step 59. Since the amount of ambient light measured at step 58 is assumed to be substantially equal to the amount of ambient light included in the total brightness measured at step 62, the use of the compensated reference data provides a true comparison of the true red light brightness with the uncompensated reference data. If the uncompensated reference data were used instead, no allowance would exist for the falsely high value of the measured data, as opposed to the true value of red light brightness alone, and the comparison would be inaccurate.

If the comparison indicates that there is a difference between the data corresponding to the measured low brightness red light and the compensated reference data at step 63, at step 64 CPU 11 transmits a control signal to drive circuit 8 to change the bias of internal biasing circuit 8a for the red signal R by one step so that the red light brightness at display screen 9a is changed by one step.

CPU 11 then returns to step 62 to again measure the total brightness and to compare the data corresponding to the measured brightness with the compensated reference data and to change the red bias as necessary until the data corresponding to the measured brightness is equal to the compensated reference data or within a predetermined allowable range thereabout. When such equality is determined in step 63, at step 65 CPU 11 controls signal generator 24 to produce a high brightness red video signal to display a high brightness red light at display screen 9a. CPU 11 then repeats the steps of measuring the total brightness at display screen 9a, comparing the corresponding data to compensated reference data for the high brightness red signal and changing the red bias as necessary to achieve the required equality, and this proceeds until equality is reached in the same manner as steps 51 through 64.

Thereafter, CPU 11 moves to step 71 in which a green adjustment corresponding precisely to the previously described red adjustment is performed, in which a low brightness green light and a high brightness green light are measured and the corresponding data are compared with compensated reference data and the bias for the green signal is altered stepwise to bring the measured and reference values into equality. In step 72, a corresponding blue adjustment is performed to adjust the low brightness and high brightness blue light. When the white balance adjustment is finished at the end of step 72, at step 73 character generator 23 is caused to output a character video signal to display an indication that the white balance adjustment is completed. This indication is displayed for a predetermined time in a portion of display screen 9a outside of window portion 9b, for example in an upper portion of display 9a, to ensure that it will be visible to the operator. Routine 50 then ends in step 74 (FIG. 4A), and color television monitor 100 returns to its normal mode. In addition, the data used in establishing the white balance, including the set of color temperature data retrieved from memory 33 as well as the measured color temperature data, remain stored in RAM 13 after routine 50 ends.

It is contemplated in the present invention that monitor 100 will need to have its white balance periodically adjusted. Therefore, it may happen that on a second or subsequent adjustment process, when routine 50 reaches step 53 (FIG. 4A), the operator may indicate that the white balance is to be established in response to a new set of color temperature data, rather than the first set of color temperature data stored in memory 33 at the factory. In order to provide a new set of color temperature data, monitor 100 itself is used to generate high and low brightness red, green and blue signals, which are respectively measured and then stored in memory 33. It is assumed at this time that monitor 100 is operating properly or has been adjusted to a particular desired operating state so that the color temperature derived from the measurements will correspond precisely to a desired reference state. In measuring these low and high brightness signals, however, once again probe 30 will pickup and incorporate in its sensed brightness the ambient light brightness. Therefore, in accordance with the present invention, the ambient light brightness is also measured in this memory set operation and is used to correct the measured data in order to remove the influence of ambient light on the ultimately produced reference data.

If the operator indicates by input of the appropriate command from keyboard 14 that new reference data is to be measured, CPU 11 enters a memory set mode and proceeds to step 81 wherein it causes character generator 23 to output a character video signal to display on display screen 9a an inquiry as to which of the four sets of data is to be redefined (or initially defined) by the storage of new data in memory 33 at a corresponding location therein. Assuming that the operator indicates that the second set, for example, is to be defined by inputting an appropriate command at keyboard 14, CPU 11 proceeds to step 82 at which character generator 23 outputs the character video signal causing the display of window portion 9b and the instruction to the operator to have probe 30 attached to screen 9a at window portion 9b. The operator attaches probe 30 at window portion 9b and indicates through keyboard 14 that this operation is complete. In response to this input, CPU 11 at step 83 sends a control signal to drive circuit 8 to cutoff all the primary color signals R, G, B, thereby putting CRT 9 in its nonlight emitting state. At step 84, CPU 11 causes moveable contact 25a to contact fixed contact 25c so that the output signal from photosensor device 31 is supplied through amplifier 32 and switching circuit 25 to sample and hold circuit 26, which samples the output signal at the predetermined timing corresponding to the position of photosensor device 31 on display screen 9. The sampled signal is converted to digital form by A/D converter 28 and is stored in RAM 13. Thus, steps 82–84 correspond to previously described steps 56–58.

At step 85, the low brightness red video signal is generated by signal generator 24 are supplied to CRT 9 and the green and blue signals G and B are cutoff by drive circuit 8, as in step 61. In step 86, a signal corresponding to the low brightness red light and the ambient light received by photosensor device 31 is supplied through switch 25 with its moveable contact 25a now contacting fixed contact 25c to A/D converter 28, where it is converted into digital form and stored in RAM 13 as in step 62 above. In the memory set mode, of course, the measured data is not compared with any reference data, since the measured data is intended to become reference data itself. Therefore, after the digital data indicative of the amount of low brightness red light together with ambient light is stored in RAM 13, a high brightness red signal is generated by signal generator 24 in step 87, and its level is measured and stored in the same manner in steps 85 and 86.

In step 91, the low brightness and high brightness green light are measured and stored in RAM 13, while in step 92 the low brightness and high brightness blue light are measured and stored. When the measurement process of steps 85–92 is complete, the ambient light data measured in step 84 is subtracted from all the above-mentioned measurements of low and high brightness red, green and blue lights to obtain the true values of the respective colored lights by eliminating the contribution of the ambient light. Then, at step 94, the corrected data is transferred through port 43 to memory 33 and written in memory 33 at the location defining the second set of color temperature data, as was selected at step 81. In step 95, a character video signal from character generator 23 causes the display of a "completed "indication on screen 9a. At step 96 routine 50 ends and color television monitor 100 is returned to its normal operating mode.

In accordance with an aspect of the present invention, it is possible to use a second monitor 100' to generate the reference color temperature data for monitor 100. As illustrated in FIG. 2B, monitor 100' is used as the reference light source and is assumed to be operating properly. It is supplied with the primary color signals R, G, B from matrix circuit 4 in monitor 100 through a connector 45 (FIG. 1) and a cable 110 (FIG. 2B). Consequently, all the images generated in response to commands from CPU 11 will appear on screen 109a' of monitor 100'. Thus, although window portion 9b is illustrated in phantom lines on display screen 9a of monitor 100 for the purpose of this description, in practice it will appear on display screen 109a' of monitor 100' behind probe 30.

In the memory set mode using monitor 100' as a reference light source, at step 83 connector 45 cuts off the primary color signals R, G, B to a predetermined level, for example −5 IRE, and a drive circuit of monitor 100' is produce the low and high brightness red, green and blue lights at predetermined times corresponding to the appropriate times for measurement as in previously described steps 84–93. Plug 34 is connected in this memory set mode to jack 44 of monitor 100, and so the measured values are supplied directly to RAM 13 of monitor 100 and then back to memory 33 of probe 30. In this way, reference data from a known reference source may be provided to a number of different monitors to standardize the reference values used.

At the end of the adjustment process as described above, the data indicating the correct gain, bias etc. levels for the color saturation, hue, brightness, contrast and white balance remain stored in RAM 13. Since RAM 13 is backed up by battery 16, the data is not erased when monitor 100 is turned off, but rather is maintained in RAM 13. Therefore, the next time monitor 100 is turned on, CPU 11 transmits control signals to the rear stage circuits to set them in accordance with the relevant data stored in RAM 13 to thereby attain the adjusted color saturation, hue, brightness, contrast and white balance as previously established.

Thus, in accordance with the present invention, the color saturation, hue, brightness, contrast and white balance may be automatically adjusted. In particular, since the data measured for the low and high brightness red, blue and green light is compensated for by the measured ambient light, it is possible to compensate the reference data during the white balance operation for the ambient light existing at that particular time, and it is also possible to adjust measured reference values by the ambient light existing at that particular time.

Since the measurement of the reference values may occur at one time and the white balance adjustment may occur at a later time, it is quite possible that the ambient light at these two times will be different. It is a highly advantageous feature of the present invention that the ambient light is measured at the time that the ambient light data is to be used, both during reference value measurement and white balance adjustment, thereby giving a true reflection of the actual prevailing conditions. This feature of the present invention has the additional advantage that the offset and drift of amplifier 32 at the time the ambient light is measured may be considered to be a component of the ambient light, since it is present to the same extent both in the ambient light measurement and in the immediately following light and low brightness color light measurements. Consequently, the compensation of the measured values during white balance adjustment and the correction during the memory set operation will eliminate the offset and drift from the true values. Therefore, it is unnecessary to provide an overly complicated and expensive chopper amplifier as amplifier 32 in order to reduce the absolute offset and drift thereof, and consequently probe 30 can be simplified in construction and can be made less expensive.

Figure 5:
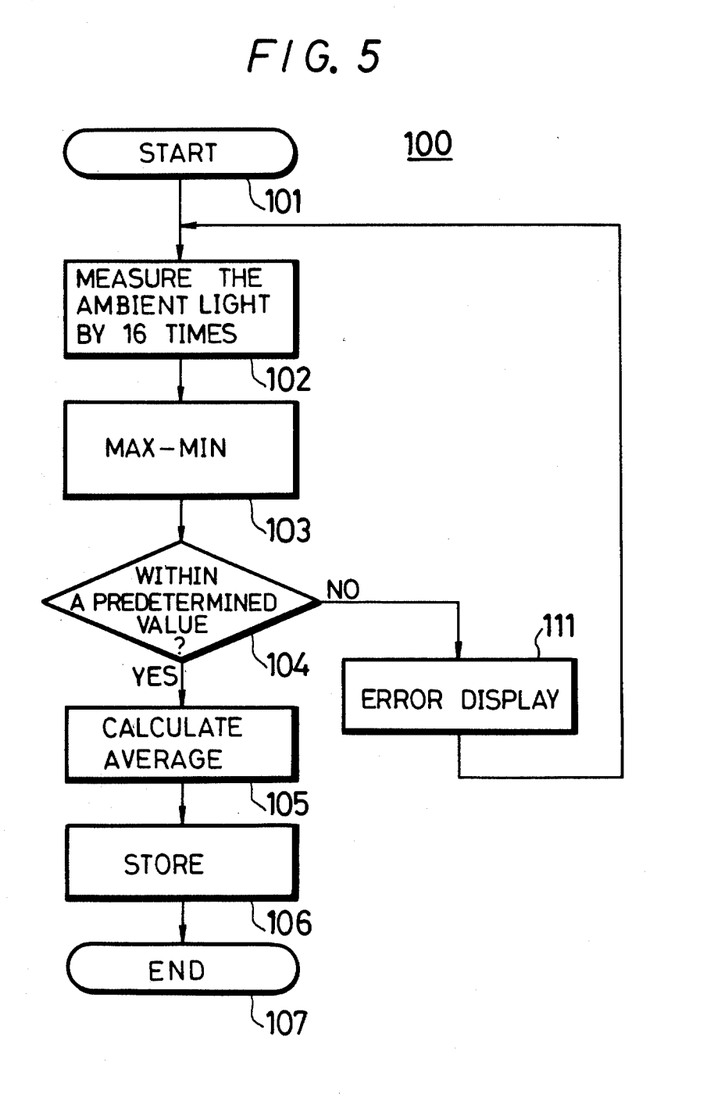
FIG. 5 is a flow chart of a routine for the measurement of ambient light performed by the apparatus according to the present invention.

The measurement of the ambient light in steps 58 and 84 will now be described in detail in connection with FIG. 5, which is a flow chart of a routine 100 stored in ROM 12. At step 101, CPU 11 loads routine 100 and at step 102 the ambient light is measured 16 times. The 16 measurements are taken because the ambient light itself can vary proportionally greatly, and so an average ambient light measurement is a more appropriate measurement of the ambient light likely to be present when each low and high brightness colored light is measured soon thereafter.

At step 103, the difference between the maximum and the minimum of the 16 measured values is calculated, and at step 104 it is determined whether this difference is within a predetermined tolerance limit. If the difference is within the tolerance limit, the variations in ambient light are considered small enought to be ignored, indicating that the ambient light is fairly stable, from which it is estimated that the ambient light present when each low and high brightness colored light is measured can be sufficiently compensated for by the data indicative of the ambient light measured at step 102. Therefore, at step 105 an average value of the 16 measured values is calculated, and at step 106 the average value is stored in RAM 13 as the ambient light data. Program 100 then ends at step 107.

If, on the other hand, it is determined at step 104 that the difference between the maximum and minimum values exceed the tolerance limit, it is assumed that the variations in the ambient light are too large to be ignored and may reflect, for example, a situation in which a light has just been turned on or various lighting fixtures are flickering. Thereafter, at step 111 CPU 11 causes character generator 23 to output a character video signal to cause the display of an indication that the white balance cannot be adjusted by the ambient light just measured. Thereafter, the process returns to step 102 to remeasure the ambient light to determine if the prevailing conditions have stabilized. The process will then continue until the ambient light is acceptably measured or until the operator terminates the procedure.

As mentioned above, many different types of color bar generators are available for producing different types of color bar signals, such as the EIA color bar signal illustrated in FIG. 3A, the full field color bar signal illustrated in FIG. 3B, and others, such as the EBU (European Broadcasting Union) color bar signal, not illustrated. The color bar signal selected as the standard differs from region to region, e.g. it may be different in America and Europe, as well as differing from broadcast station to broadcast station. Therefore, as mentioned above, it is necessary for the operator to input the type of color bar signal being used in order to perform the adjustment for color saturation and hue. However, since it is necessary in this automatic adjustment to sample the video signal produced during certain color bar periods, for example periods $T_1$-$T_4$ of FIG. 3C, it is necessary for sampling pulse generator 27 to generate the sampling pulses for sample and hold circuit 26 at the appropriate times during the horizontal scan period so that the proper color bars are sampled. When several different color bar signals are possible, however, a pulse generating circuit that can separately generate the whole variety of sampling pulses is generally quite complicated and expensive. In order to remove this difficulty, an improved sampling pulse generator 27 suitable for use in monitor 100 is illustrated in FIG. 6 together with the elements of monitor 100 of FIG. 1 with which it cooperates.

Figure 6:
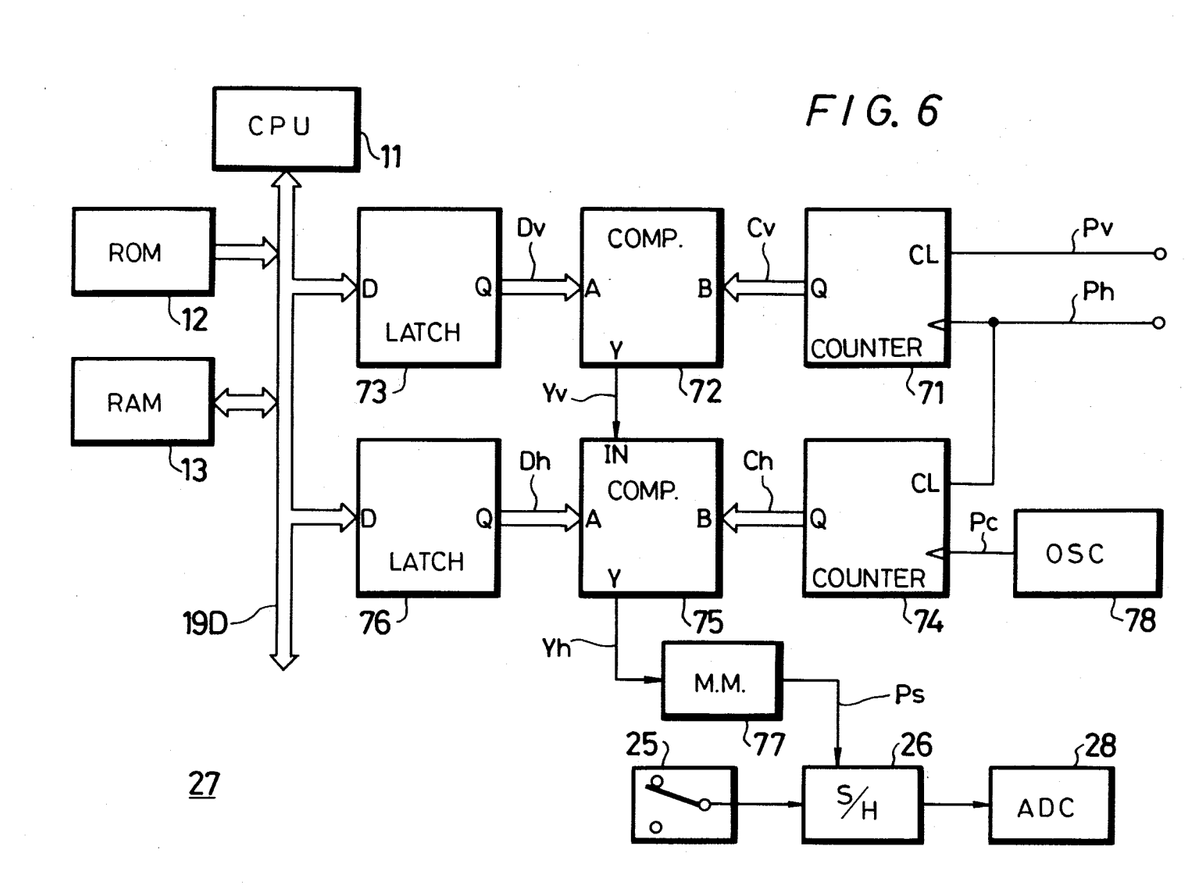
FIG. 6 is a block diagram illustrating a sampling pulse generating circuit of the apparatus illustrated in FIG. 1.

Referring now to FIG. 6, sampling pulse generator 27 includes an eight bit vertical address counter 71 which is supplied with horizontal synchronizing pulses Ph and vertical synchronizing pulses Pv separated from the input color bar signal. Horizontal synchronizing pulses Ph are received at a counting input at counter 71 while vertical synchronizing pulses Pv are received at a reset input. Therefore, the output value Cv produced by counter 71 is reset to zero at the beginning of each field period and is incremented by one at each line, so that the counted value Cv represents the vertical address of the current scanning position. Since the number of horizontal lines in is 262.5 the NTSC system and is 312.5 in the CCIR system and counter 71 has eight bit accuracy, counter 71 will overflow when the counted value Cv reaches 255. Therefore, counter 71 is so constructed that it stops counting after counting 255 horizontal synchronizing pulses Ph and retains that value until the next vertical synchronizing signal Pv. The position at which probe 30 is attached to display screen 9a will therefore be established above the lower part of display screen 9a above the 255th horizontal line of the image.

Counted value Cv from counter 71 is supplied as one input to an eight bit comparator circuit 72. ROM 12 or RAM 13 stores vertical address data Dv of the desired sampling point intended to correspond with a position within the color bar to be sampled. Vertical address data Dv is supplied by CPU 11 over a data bus 19D within system bus 19 to a latch 73, wherein it is latched and then supplied as the second input to comparator circuit 72.

Similarly, sampling pulse generator 27 includes an eight bit horizontal address counter 74 which is supplied with a clock pulse Pc from an oscillator 78. Clock pulse Pc has a frequency appropriate for dividing each horizontal line into at most 255 portions, so that each portion may be represented by an eight bit address. An example of an appropriate frequency is 3.5 MHz. Horizontal address counter 74 receives clock pulse Pc at its counting input and receives the horizontal synchronizing pulse Ph as its reset input. Therefore, the output counted value Ch from counter 74 is reset to zero at the beginning of each horizontal scanning period and is incremented by one at every clock pulse Pc so that counted value Ch represents a horizontal address of the current scanning position.

Counted value Ch from counter 74 is supplied as one input to an eight bit comparator circuit 75 corresponding to comparator circuit 72. In a manner analogous to the provision of vertical address data Dv, CPU 11 provides horizontal address data Dh defining the horizontal address of the sampling point within the color bar through data bus 19D to a latch 76, wherein it is latched and then provided to comparator circuit 75 as its second input.

Comparator circuit 72 compares vertical address data Dv with counted value Cv to produce an output Yv which is normally low and becomes high when Dv equals Cv. Output Yv is supplied to comparator circuit 75 as an enable signal. Comparator circuit 75 compares horizontal address data Dh with counted value Ch to produce a comparison output Yh which is normally low and becomes high when Dh equals Ch and which is supplied as a trigger to a monostable multivibrator 77. The output of monostable multivibrator 77 is supplied to sample and hold circuit 26 as a sampling pulse Ps.

The operation of sampling pulse generator 27 is as follows. Comparator circuit 72 is always enabled and repetitively compares counted value Cv with vertical address data Dv to determine the horizontal scanning period in which Cv equals Dv. At that point, output Yv becomes high and enables comparator circuit 75. During this enabled period, comparator circuit 75 repetitively compares horizontal address data Dh with counted value Ch and outputs signal Yh at a high level when the two are equal. Therefore, the sampling point is defined as the scanning position with vertical address Dv and horizontal address Dh as specified by CPU 11, and whenever the electron beam generated in CRT 9 in response to the color bar signal reaches this scanning position, signal Yh becomes high and triggers monostable multivibrator to output sampling pulse Ps having a predetermined pulse width. As a result, sample and hold circuit 26 samples the color bar signal at a time when the appropriate color bar is being generated, that is, when the scanning position is at vertical address Dv and horizontal address Dh.

Through the use of sampling pulse generator 27 as constructed in FIG. 6, the sampling point or points can be arbitrarily selected simply by specifying the vertical and horizontal addresses Dv and Dh and by entering the addresses to be stored for use by CPU 11 in RAM 13. Alternatively, known addresses for known color bar signals may be stored in ROM 12, and the operator need only identify the type of color bar signal in use. It is therefore possible to obtain the data indicative of the level of the desired color signals in order to effect the color saturation and hue adjustment regardless of which color bar signal is being used. The horizontal and vertical address data Dv and Dh of the desired sampling point may be entered into RAM 13 through keyboard 14 in advance and read out therefrom at the time of adjustment, so that the hardware and software can both be simplified, or may also be entered through keyboard 14 at the time of adjustment.

Figure 7:
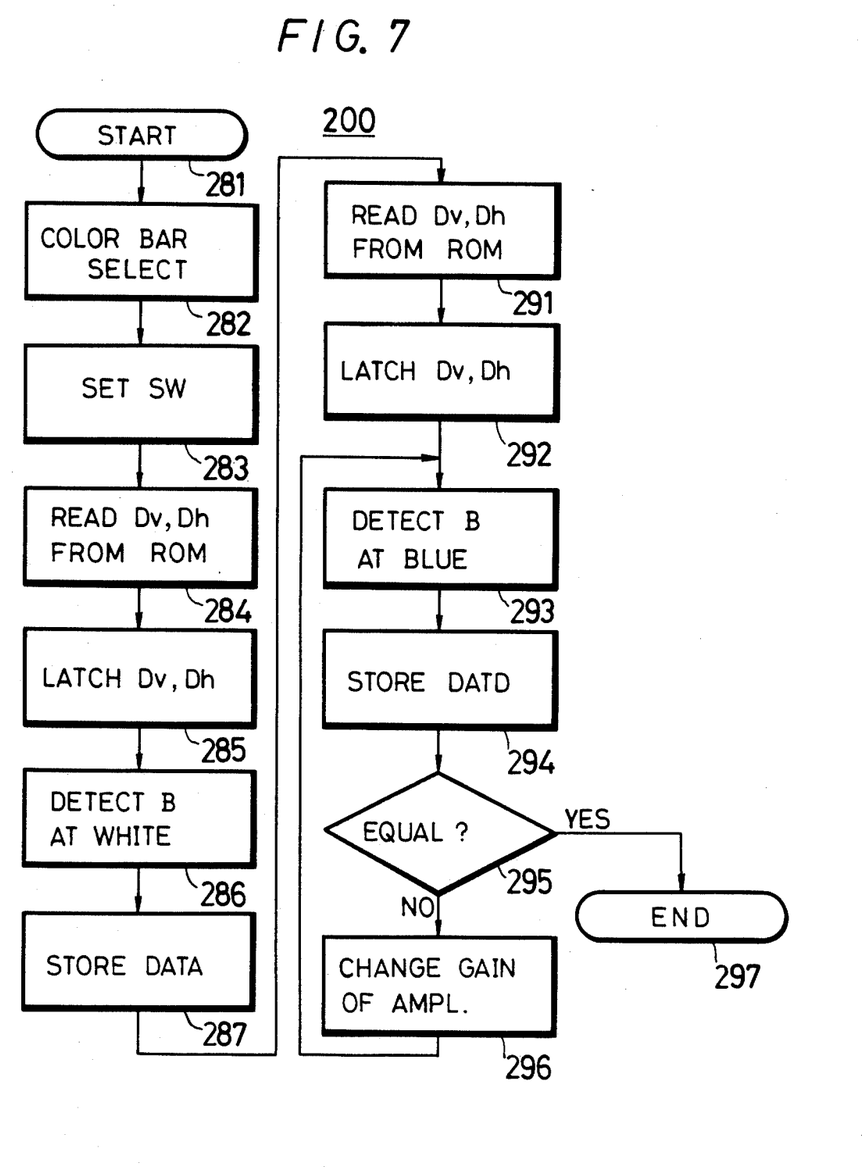
FIG. 7 is a flow chart of a routine for color saturation adjustment performed by apparatus according to the present invention incorporating the sampling pulse generating circuit of FIG. 6.

The operation of monitor 100 in performing a routine 200 for color saturation adjustment when incorporating the above-described pulse generating circuit 27 is illustrated in FIG. 7. Routine 200 is loaded at step 281 and in step 282, CPU 11 causes character generator 23 to transmit the character video signal to request the operator to input an identification of the particular color bar signal to be used. After the operator inputs the identification through keyboard 14 CPU 11 sets switching circuits 2 and 25 to the positions indicated in FIG. 1, that is, with moveable contact 2a contacting fixed contact 2b and moveable contact 25a contacting fixed contact 25b. At step 284, the vertical and horizontal address data Dv(w), Dh(w) indicative of the vertical and horizontal addresses of the sampling point within the white bar are read out from ROM 12 and supplied through data bus 19D to be respectively latched in latches 73 and 76. Thereafter, when the scanning position reaches the address indicated by vertical and horizontal address data Dv(w) and Dh(w), that is, at the sampling point within the white bar, sampling pulse Ps is generated and supplied to sample and hold circuit 26 to sample the blue signal B at this point. Data indicative of the level of the blue signal B is obtained through A/D converter 28. At step 287, this data is stored in RAM 13. At step 291, vertical and horizontal address data Dv(B) and Dh(B) indicative of the vertical and horizontal addresses of the sampling point within the blue bar are read from ROM 12 and respectively latched by latches 73 and 76 in step 292. In the manner indicated above, when the scanning position is equal to the sampling position, the sampling pulse Ps is supplied to sample and hold circuit 26 and the level of the blue signal B in the blue bar is sampled, and the data indicative of the level of the signal is obtained through A/D converter 28. This data is then stored in RAM 13 at step 294. In step 295, CPU 11 compares the level of the blue signal B sampled during the white bar and stored at step 287 with the level of the blue signal B sampled during the blue bar and stored at step 294. If the two levels are not equal, CPU 11 proceeds to step 296 wherein the gain of amplifier 5 is changed by one step, as discussed above, to change the level of the carrier chrominance signal. CPU 11 then returns to step 293 to repeat the operations of steps 293 through 296 repeatedly until the level of the blue signal B sampled during the blue bar is equal to the level of blue signal B during the white bar. When the two levels agree or are within a predetermined tolerance range, it is determined that the color saturation has been correctly adjusted and CPU ends routine 200 at step 297.

Sampling pulse generator 27 as illustrated in FIG. 6 is also advantageously used when the white balance is adjusted when data indicative of the vertical and horizontal address at which photosensor 31 is presented is supplied from ROM 12 by CPU 11 and latched in latches 73 and 76 for comparison with counted values Cv and Ch. As discussed above, this position is advantageously at the center of display screen 9a.

Although a preferred embodiment of the apparatus according to the present invention has been described in detail with reference to the drawings, it will be apparent that the invention is not limited to that precise embodiment, and that many modifications and variations could be effected therein by one skilled in the art without departing from the spirit or scope of the invention as defined by the appended claims.

I claim:

1. Apparatus for automatically establishing a color balance of a color television monitor including a color cathode ray tube having a display surface at which a television image is presented, comprising:
adjustable drive means for driving said color cathode ray tube to produce a color image;
sensor means adapted for separable attachment to said display surface for sensing thereat an ambient light brightness when said drive means does not drive said color cathode ray tube and providing ambient light data corresponding to the sensed ambient light brightness;
a source of reference data indicative of a reference color balance of said color image;
compensating means for compensating said reference data with said ambient light data; and
adjusting means for controlling said adjustable drive means in response to the compensated reference data to establish said color balance of said color image independent of said ambient light brightness.

2. Apparatus according to claim 1, further comprising means for controlling said color cathode ray tube to display at said display surface a television image including a predetermined sensing area, said sensor means being adapted for attachment at said predetermined sensing area.

3. Apparatus according to claim 1, wherein said sensor means includes a sensor device and memory means for storing a plurality of sets of color temperature data which can be withdrawn from said memory means as said reference data.

4. Apparatus according to claim 3, wherein said control means includes pulse generating means for generating a pulse when a scanning position of said color cathode ray tube is coincident with a position of said sensor device when said sensor means is attached to said display screen, said sensor means sensing said ambient light brightness in response to said pulse.

5. Apparatus according to claim 3, wherein said memory means is non-volatile memory means.

6. Apparatus according to claim 3, wherein one of said sets is a set of color temperature data at a predetermined color temperature.

7. Apparatus according to claim 3, wherein said adjusting means includes random access memory means for storing a selected one of said sets of color temperature data from the first mentioned memory means and said ambient light data from said sensing means, and central processing unit means for processing said selected set of color temperature data and said ambient light data.

8. Apparatus according to claim 7, wherein said compensating means generates said compensated reference data by adding said ambient light data to the set of color temperature data stored in said random access memory, said compensated reference data being then stored in said random access memory means.

9. Apparatus according to claim 8, further comprising means for transferring data between said random access memory means and said first mentioned memory means.

10. Apparatus according to claim 7, wherein said adjusting means further includes battery means for backing up said random access memory during power turn-off.

11. Apparatus according to claim 7, wherein said sensor means senses a total brightness including said ambient light brightness and an image brightness when said drive means drives said color cathode ray tube and provides total light data corresponding to the sensed total brightness.

12. Apparatus according to claim 11, wherein said central processing unit compares said total light data to said compensated reference data and controls said adjustable drive means in response to the comparison.

13. Apparatus according to claim 12, wherein said central processing unit controls said adjustable drive means so as to equalize said total light data and said compensated reference data.

14. Apparatus according to claim 11, wherein said central processing unit subtracts said ambient light data from said total light data to generate one of said sets of color temperature data and transfers the generated set of color temperature data to said memory means in said sensor means.

15. A method for automatically establishing a color balance of a color television monitor including a color cathode ray tube having a display surface at which a television image is presented, comprising the steps of:
sensing an ambient light brightness at said display surface when said color cathode ray tube is not driven;
generating ambient light data corresponding to the sensed ambient light brightness;
providing reference data indicative of a reference color balance of said color image;
compensating said reference data with said ambient light data; and
adjustably driving said color cathode ray tube in response to the compensated reference data to establish said color balance of said color image independent of said ambient light brightness.

16. A method according to claim 15, further comprising the steps of:
sensing a total brightness at said display surface including said ambient brightness and an image brightness when said color cathode ray tube is driven;
providing total light data corresponding to the sensed total brightness; and
comparing said total light data to said compensated reference data;
wherein said step of adjustably driving said cathode ray tube is performed in response to the comparison.

* * * * *